3,582,296
GASIFYING PROCESS
Shuji Umano, Kanagawa-ken, and Koh Nakasugi and Yoshihisa Imai, Tokyo, Japan, assignors to Toyo Engineering Corporation, Tokyo, Japan
Filed July 5, 1968, Ser. No. 742,850
Claims priority, application Japan, July 15, 1967, 42/45,562
Int. Cl. C01b 2/14
U.S. Cl. 48—215
8 Claims

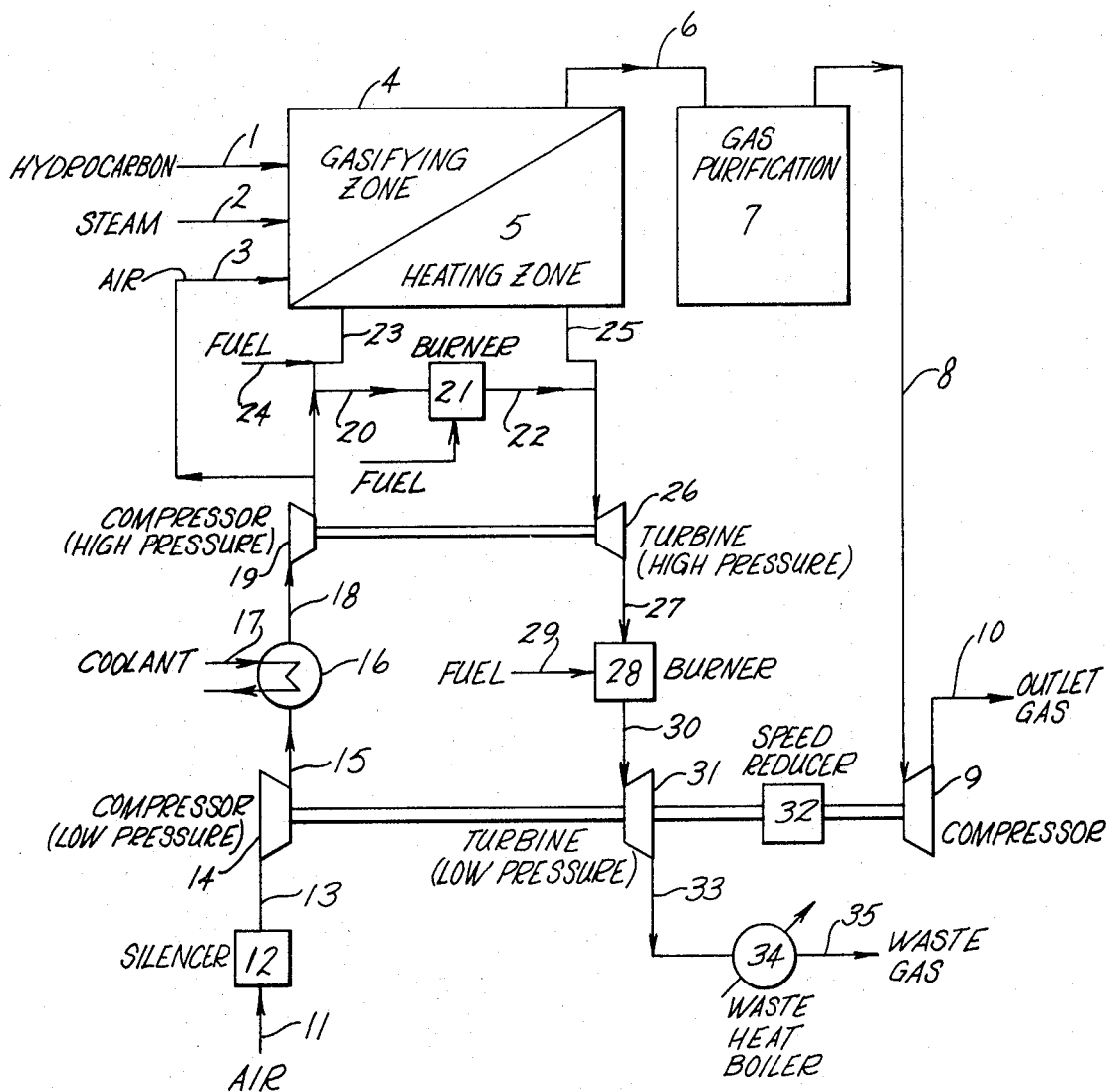

ABSTRACT OF THE DISCLOSURE

A process for producing from hydrocarbons a hydrogen-containing gas in which a mixture of hydrocarbons and a gasifying agent is fed into a furnace where it is heated by a high temperature combustion gas and the combustion gas is then fed to at least one turbine to recover useful energy.

BACKGROUND OF THE INVENTION

Field of the invention

This invention relates to a process for producing from hydrocarbons a gaseous mixture containing hydrogen as a main component and adapted to be used for various purposes.

Description of the prior art

As typical processes for the industrial manufacturing of hydrogen-containing gases, there have been already intensively utilized (1) an externally heated type gasifying process wherein a hydrocarbon is decomposed and gasified by passing through a catalyst bed in a tube heated from the outside together with such gasifying agents as steam and air, and (2) an internally heated type gasifying process wherein a hydrocarbon is noncatalytically decomposed and gasified at a high temperature by using oxygen as the gasifying agent.

Both of these two processes are excellent. In the former process, in the production of the synthesis gas for an ammonia synthesis, which is one of the greatest uses of hydrogen-containing gases, a raw mtaerial, such as natural gas or naphtha, is catalytically decomposed with steam and with air which is a gasifying agent and is at the same time a nitrogen source for the production of ammonia. This process has advantageous features in that no separate means of feeding pure nitrogen are required and that the process is carried out at a comparatively low temperature.

However, in this process, when there is fed in an equivalent quantity of air necessary and sufficient to attain the ratio of hydrogen to nitrogen required to synthesize ammonia, not enough oxygen is introduced to decompose the raw material by itself.

Therefore, an external heat supply is necessary. The gasifying furnace is made two stages so that in the primary gasifying furnace, an endothermic reaction represented by the following formula takes place at a comparatively low temperature and the heat required for the reaction is supplied by heat from outside.

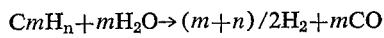

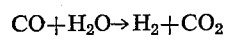

In the secondary gasifying furnace, air is mixed into the process stream and a patrial oxidizing reaction, which is exothermic, also takes place to produce a gas having the desired ratio of hydrogen to nitrogen.

However, in this process, there are such disadvantages that the dimensions of the apparatus, particularly of the primary gasifying furnace, are too large, that the structure is rather complicated, and that control is difficult.

In the latter process, pure oxygen is added to a heavy oil or a crude oil stream so that a partial oxidation reaction takes place and the oil is thermally decomposed by the reaction heat. However, there is a disadvantage that a costly air separating plant for feeding pure oxygen is required.

To provide a process for gasifying hydrocarbons wherein said respective disadvantages in the above-described two processes are eliminated, we have devised the following process.

SUMMARY OF THE INVENTION

The present invention provides a process for gasifying hydrocarbons with gasifying agents consisting of steam and/or air wherein a process stream of hydrocarbon and gasifying agents is pressurized so as to be at substantially the same pressure as the pressure of a high temperature heating gas so that the process stream is heated through a heat transfer wall in a catalytic or noncatalytic pressurized gasifying furnace so as to be gasified. The heating gas is fed from the furnace to a turbine so that power is recovered from the heating gas with the above-mentioned turbine.

BRIEF DESCRIPTION OF THE DRAWING

The constitution and the effect of the present invention are explained more fully with reference to the accompanying drawing which illustrates a flow diagram of the process according to the present invention.

DESCRIPTION OF THE PREFERRED EMBODIMENT

Through tube 1, (a) the raw hydrocarbon vapor at a higher pressure, through tube 2, (b) steam, one of the gasifying agents, and through tube 3, (c) air, the other gasifying agent, are introduced into the pressurized gasifying furnace 4.

Into the pressurized gasifying furnace 4, hydrogen and/or carbon oxides which are recycled from the later purifying stages, may be supplied, if desired, to improve the gasifying reaction.

The process stream, which consists of the raw hydrocarbon and gasifying agents, is gasified by means of a catalytic or noncatalytic reaction. The heat necessary for the decomposing and reforming process is supplied from the heating zone 5 which operates at substantially the same pressure as the process stream and which therefore can be constructed as a chamber separated from the gasifying zone by a relatively thin partition wall for heat transfer purposes. The partition wall in the pressurized gasifying furnace 4 is made of a heat resistant material having a high tensile strength. The pressure difference between the process stream and the heating gas of high temperature on opposite sides of said heat transfer partition wall is made as small as possible. The less severe requirement for the strength of the material of the heat transfer wall, which stems from the smaller pressure difference, is utilized to make it possible to reduce the thickness of the heat transfer wall and also to elevate the temperature of the high temperature heating gas.

When an ammonia synthesizing gas is produced, the quantity of the pressurized air feed through pipe 3 is adjusted so that, in the gas composition obtained through the outlet pipe 10, the molar ratio of hydrogen to nitrogen is 3:1.

Further, when an ammonia synthesizing gas is produced, pipe 3 is not required and only raw material and steam need to be fed into the gasifying furnace 4.

A gaseous mixture consisting of hydrogen, nitrogen, carbon dioxide, carbon monoxide and methane produced in the gasifying furnace 4 is passed into a known refining step, for example, a gas purification step 7, in which there can be effected various refining steps, such as carbon monoxide conversion, carbon dioxide removal, methanation through pipe 6 and carbon oxide removal.

When the process of the present invention is used for manufacturing fuel gas, such purification is not required.

In case a methanol synthesis gas is to be produced, only a part of the carbon dioxide gas is removed and the quantity of carbon dioxide in the gas flowing through outlet pipe 10 is adjusted.

The gaseous mixture, having had the unnecessary components removed by means of the refining step 7, is introduced into hypercompressor 9 through pipe 8, is compressed as desired, and is passed to a subsequent step not illustrated in the figure, for example, an ammonia synthesis loop or a methanol synthesis loop through outlet pipe 10.

For the purpose of adding the required quantity of heat to the heating zone 5 in the pressurized gasifying furnace 4 and at the same time generating power, first of all, air is sucked into a silencer 12 from the atmosphere through pipe 11. The silencer 12 absorbs the sounds generated in the gas turbine.

The air leaving silencer 12 is introduced into a low pressure compressor 14 through pipe 13, is subjected to compression in the first stage, then passes to an intermediate cooler 16 through pipe 15, is cooled with cooling water fed through pipe 17, then passes to a high pressure compressor 19 through pipe 18, and is subjected to compression in the second stage.

In case an ammonia synthesizing gas is being produced, a part of the thus compressed air is added to the process stream flow in the pressurized gasifying furnace 4 through pipe 3.

Further, another part of the compressed air from compressor 19 is flowed to a burner 21 through a pipe 20 at the time of starting up the operation of this apparatus or to control the operating conditions.

This burner 21 is also utilized as a start-up burner for supplying heated gas to the turbine instead of the heated gaseous products of combustion from the heating zone 5 when starting up the operation, at which time the heating zone 5 of the gasifying furnace 4 is not yet fully pressurized and heated.

Further, not only at the time of starting up the operation but also when the load on the heating zone 5 has increased, a quantity of heat required to insure the desired operation of the turbine will be supplied by the burner 21. As the heat in the pressurized gasifying furnace 4 is transferred mostly by radiation, it is necessary to bring the combustion gas in the heating zone 5 as close as possible to the theoretical combustion flame temperature. Therefore, the bypass of the pressurized gasifying furnace 4 comprising the pipe 20, burner 21 and pipe 22 is utilized also to regulate the amount of air entering the pressurized gasifying furnace through the pipe 23 so as to approach the theoretical quantity of air for the combustion of the fuel fed through a pipe 24.

High pressure air and fuel is passed to the heating zone 5 through the pipe 23.

Fuel is mixed with the air before its introduction through pipe 23 and is burnt in the heating zone 5 for the two purposes of (1) heating the pressurized gasifying furnace and (2) producing a high temperature, high pressure gaseous mixture for driving the gas turbine.

This gaseous mixture heats the process stream flowing through the furnace 4 by transferring heat via the heat transfer partition wall. The temperature of the gaseous mixture in zone 5 is reduced, and it passes to a high pressure turbine 26 through pipe 25 and drives the turbine.

The high pressure air or the gaseous mixture from the burner 21 flows through pipe 22 and joins with the gaseous mixture flowing through pipe 25 and this mixture then enters the high pressure turbine 26. The gas from pipe 22 is adjustable to control the temperature at the inlet of the high pressure turbine. The gases from pipes 22 and 25 expand in the turbine and generate power. This power is utilized to drive the high pressure compressor 19.

The thus expanded gaseous mixture, having had the temperature thereof reduced, is passed to the burner 28 through pipe 27. The gaseous mixture is heated here with the combustion heat of the fuel added through pipe 29, is introduced into the low pressure turbine 31 through pipe 30, is again expanded in the turbine and generates power. The low pressure compressor 14 is driven by a part of this power. The rest of the power drives the hypercompressor 9 through speed reducer 32.

The gaseous mixture leaving the low pressure turbine 31 through pipe 33 is still at a considerably high temperature. It is therefore utilized as a heat source for the waste heat boiler 34 and is discharged at atmospheric pressure through pipe 35.

Each of the compression and expansion steps referred to above is made in two stages in the above explanation but it may be made, as desired, in one stage or in three or more stages.

In the process of the present invention as described above, there will be an important advantage that the pressure difference between the heated process stream flowing through the furnace 4 and the heating gas in the heating zone 5 is made so small and the temperature of the heating as is so high that the pressurized gasifying furnace itself can be made quite small.

The second advantage is that no oxygen is required as a gasifying agent and therefore no air separating device is required.

The third advantage is that, because the pressure difference between the process stream and the heating fluid in the pressurized gasifying furnace is minimized, the heat transfer partition wall of the pressurized gasifying furnace is safe to use at a temperature higher than that in the conventional externally heated type gasifying process.

The fourth advantage is that although generally it is economical to carry out the gasifying step under a higher pressure, in case the process of the present invention is used for the production of an ammonia synthesizing gas, the power required to regulate the high pressure air required as a part of the process stream flow will be self-supplied and the power required to compress the air for producing the heating fluid and to compress the gaseous mixture or gas obtained by this gasifying step can be all self-supplied.

The fifth advantage is that generally in a gas turbine, in order to prevent the damage of the turbine blades or the like by excessive heat, the temperature of the operating gas at the inlet is limited. Therefore, the rate of excess air reaches as high as 400% and, at such a high rate of the excess air, a decrease in the thermal efficiency of the turbine is inevitable. But according to the process of the present invention, because heat is supplied to the process stream flow from the heating zone of the pressurized gasifying furnace 4, the gas turbine can be operated at a rate of the excess air far lower than that in an ordinary gas turbine and, therefore, the thermal efficiency of the gas turbine is remarkably high.

Further, the operating gas leaving the gas turbine is still at a considerably high temperature and therefore can be fed to a waste heat boiler and utilized to generate steam. This steam can be used as a gasifying agent or for any other purpose.

An example in the case of gasifying naphtha by the process of the present invention is explained in the following.

This naphtha has a carbon to hydrogen ratio of 5:1.

EXAMPLE

In this process, a preheated naphtha desulfurized in advance, was fed into the pressurized gasifying furnace 4 at a rate or 5.9 kg./sec. at a temperature of 400° C. under a pressure of 21 kg./cm.$^2$ (gauge).

Steam was fed at a rate of 23 kg./sec. under a pressure of 21 kg./cm.$^2$ (gauge) through pipe 2 and air was fed at a rate of 13.5 kg./sec. under the same pressure through pipe 3.

Separately, 42 kg./sec. of air at a temperature of 290° C. under a pressure of 21 kg./cm.$^2$ (gauge) was introduced into the heating zone 5 and was mixed with naphtha fed at a rate of 2.4 kg./sec. through pipe 23. The naphtha was burnt in the heating zone 5 to become a heating gas. This heating gas reached a maximum temperature of about 1800° C. in the heating zone 5.

The process stream flow produced by mixing the feeds through the pipes 1, 2 and 3 was catalytically gasified by the heat supplied through the heat transfer partition wall from the heating zone 5 and the heat produced by the oxidizing reaction by the oxygen in the air added through pipe 3.

131,300 Nm.$^3$/hour (based on the dry gas) of the thus obtained gas at 100° C. at a pressure of about 19.6 kg./cm.$^2$ (gauge) were sent to the purification step 7 through pipe 6.

The composition of the gas in pipe 6 was 9.35 mol percent $CO_2$, 16.07 mol percent CO, 51.43 mol percent $H_2$, 0.20 mol percent $CH_4$, 22.67 mol percent $N_2$ and 0.28 mol percent Ar.

Then, in the refining step 7, carbon oxides were removed or methanated and the gas exiting from step 7 has a composition of 73.19 mol percent $H_2$, 0.94 mol percent $CH_4$, 25.55 mol percent $N_2$ and 0.32 mol percent Ar. The gas was then introduced into the hypercompressor 9 through pipe 8.

This gaseous mixture sucked into the hypercompressor 9 was about 116,530 Nm.$^2$/hour at about 40° C. under a pressure of about 16.5 kg./cm.$^2$ (gauge).

The gaseous mixture was compressed to a pressure of about 300 kg.cm.$^2$ in the hypercompressor 9 and was sent to an ammonia synthesis loop through pipe 10.

Air was sucked in at a rate of 141 kg./sec. through pipe 11, was compressed to a pressure of about 2.6 kg./cm.$^2$ (gauge) by the low pressure compressor 14 and was at a temperature of about 175° C. Then it was cooled to about 55° C. in the intermediate cooler 16, then was passed to the high pressure compressor 19, was compressed to a pressure of about 21 kg./cm.$^2$ (gauge) and was at a temperature of about 290° C.

A part of the thus obtained high pressure air as mentioned above, was introduced into the heating zone 5 with the fuel and a part was fed also to the pressurized gasifying furnace through pipe 3. But, in order to adjust the temperature of the operating fluid at the inlet of the high pressure turbine 26, about 77 kg./sec. of the high pressure air was sent to the burner 21 through the pipe 20.

Operating gas for the high pressure turbine at a temperature of about 750° C. was discharged at a rate of 42 kg./sec. out of the heating zone 5 through pipe 25, was joined with 78.2 kg./sec. of the operating gas through pipe 22 and was flowed at about 850° C. under a pressure of about 19.6 kg./cm.$^2$ (gauge) into the high pressure turbine 26. Power of about 36,900 kw. generated by the high pressure turbine 26 was consumed to drive the high pressure compressor 19. The pressure and temperature of the expanded operating fluid leaving the turbine 26 was reduced respectively to about 5.3 kg./cm.$^2$ (gauge) and about 605° C. The naphtha as a fuel was added to the operating fluid at a rate of 0.5 kg./sec. through the pipe 29. The temperature of the operating fluid was thereby elevated to about 750° C. by combustion of the naphtha and then the operating fluid was flowed into the low pressure turbine 31 and was expanded to atmospheric pressure.

In this case, power of 47,000 kw. was consumed to drive the low pressure compressor 14 and power of 24,400 kw. was consumed to drive the hypercompressor 9.

The operating gas leaving the low pressure turbine 31 was at a high temperature of about 430° C. Its heat was recovered by means of the waste heat boiler 34 and it was then discharged at about 125° C. into the atmosphere.

The gasifying furnace 4 used in this example has the total volume which was about ⅓ that of the gasifying furnace used in a conventional externally heated type gasifying process, and the manufacturing cost about ½ that of the conventional process.

Further, in case the process of the present invention is used to produce a raw gas for a plant having a capacity of daily production of 1,000 tons of ammonia, as compared with the conventional process, the amount of naphtha used for the process stream is not different but the amount of naphtha used for fuel is less by about 8%, the amount of the cooling water is less by about 25%, and the electric power consumption is less by about 43%.

The embodiments of the invention in which an exclusive property or priviledge is claimed are defined as follows:

1. A process for the production of hydrogen-rich gas using a gasifying furnace divided by an imperforate partition wall into a gasifying zone and a heating zone, said partition wall having high heat transfer characteristics, comprising the steps of feeding into said gasifying zone hydrocarbon and a gasifying agent selected from the group consisting of steam and mixtures of steam and air and, in said gasifying zone, reacting said hydrocarbon and said gasifying agent at a high temperature and at a high pressure to produce said hydrogen-rich gas;

simultaneously feeding into said heating zone a combustible fuel-air mixture and effecting combustion of said mixture in said heating zone so that the pressure in the heating zone is of the same order as the pressure in the gasifying zone and heat generated by said combustion is transferred through said partition wall from said heating zone to said gasifying zone in order to maintain the temperature in the gasifying zone at the reaction level;

removing the gaseous products of combustion at a high pressure from said heating zone; and then flowing said gaseous products of combustion through at least one turbine to recover power and utilizing at least part of said power for compressing the air supplied to the heating zone.

2. A process according to claim 1, in which at selected times fuel and air are fed to a burner outside of said furnace and are burned thereby, and feeding the gaseous products of combustion from said burner into said turbine.

3. A process according to claim 1, in which hydrogen and/or carbon oxides also are fed into said gasifying zone.

4. A process according to claim 3, in which the hydrogen-rich gas is fed through a gas purifying stage and the hydrogen and/or carbon oxides removed in the gas purifying stage are fed into said gasifying zone.

5. A process according to claim 1, including the step of feeding the gaseous products of combustion in series through at least two turbines, mixing the gaseous products of combustion, as same pass from one turbine to the next, with additional fuel and then again burning same prior to entry of the combustion gas into the next turbine.

6. A process according to claim 5, in which the power recovered from said next turbine is used for compressing the air fed into said heating zone and for compressing said hydrogen-rich gas after it has left said furnace.

7. A process according to claim 1, in which the power recovered by the turbine is used to compress the hydrogen-rich gas after it has left said furnace.

8. A process according to claim 1, including the steps of generating steam using the heat from the gaseous products of combustion leaving said turbine and supplying said steam to the furnace.

References Cited

UNITED STATES PATENTS

| | | | |
|---|---|---|---|
| 3,241,933 | 3/1966 | Ploum et al. | 48—196 |
| 3,429,677 | 2/1969 | Pinkston, Jr., et al. | 48—215X |
| 3,441,393 | 4/1969 | Finneran et al. | 48—215X |

R. E. SERWIN, Assistant Examiner

U.S. Cl. X.R.

23—277; 48—214; 252—373